(12) United States Patent
Devarakonda et al.

(10) Patent No.: US 8,756,599 B2
(45) Date of Patent: Jun. 17, 2014

(54) TASK PRIORITIZATION MANAGEMENT IN A VIRTUALIZED ENVIRONMENT

(75) Inventors: Murthy V. Devarakonda, Peekskill, NY (US); Patrick B. Heywood, Louisville, CO (US); Sambit Sahu, Hopewell Junction, NY (US); Kunwadee Sripanidkulchai, White Plains, NY (US); Jie Zheng, Houston, TX (US)

(73) Assignee: International Business Machines Corporation, Armonk, NY (US)

( * ) Notice: Subject to any disclaimer, the term of this patent is extended or adjusted under 35 U.S.C. 154(b) by 378 days.

(21) Appl. No.: 13/007,895

(22) Filed: Jan. 17, 2011

(65) Prior Publication Data

US 2012/0185848 A1 Jul. 19, 2012

(51) Int. Cl.
*G06F 9/455* (2006.01)
*G06F 9/50* (2006.01)

(52) U.S. Cl.
CPC .......... *G06F 9/45533* (2013.01); *G06F 9/5077* (2013.01)
USPC .............................................................. 718/1

(58) Field of Classification Search
CPC ............................ G06F 9/45533; G06F 9/5077
USPC .............................................................. 718/1
See application file for complete search history.

(56) References Cited

U.S. PATENT DOCUMENTS

2002/0016166 A1* 2/2002 Uchida et al. .................. 455/419
2006/0107268 A1* 5/2006 Chrabieh ....................... 718/100
2007/0043860 A1* 2/2007 Pabari ........................... 709/224
2008/0134178 A1* 6/2008 Fitzgerald et al. ................. 718/1
2008/0184225 A1* 7/2008 Fitzgerald et al. ................. 718/1

OTHER PUBLICATIONS

"Cloud Computing", National Institute of Standards and Technology, Cloud Computing Forum & Workshop May 20, 2010, 1 page csrc.nist.gov/groups/SNS/.../index.html.
"Secure the Virtualization & Cloud Infrastructure", 1 page, retrieved Nov. 19, 2010 http://www.vmware.com/.
"Advantages of VMware Virtualization", pp. 1-2, retrieved Dec. 30, 2010 http://www.vmware.com/technical-resources/advantages/.
"VMware vSphere—The Best Platform for Building Cloud Infrastructures", pp. 1-26, retrieved Dec. 30, 2010 http://www.vmware.com/files/pdf/vmware-vsphere-features-comparison-ch-en.pdf.
"Top 10 Reasons Why VMware vSphere 4 is Years Ahead of the Competition", pp. 1-4, retrieved Dec. 30, 2010 http://www.vmware.com/files/pdf/vmware-vsphere-top-10-reasons-ds-en.pdf.

* cited by examiner

*Primary Examiner* — Emerson Puente
*Assistant Examiner* — Steven Do
(74) *Attorney, Agent, or Firm* — Yee & Associates, P.C.; Louis J. Percello

(57) ABSTRACT

A method, computer program product, and system for managing tasks for a virtual machine are presented. An amount of resources to perform a task for the virtual machine are identified in response to receiving a request to perform the task for the virtual machine in a set of data processing systems. A set of resources in the set of data processing systems available to complete the task for the virtual machine are identified. A set of priorities for a set of phases of the task are identified. Operations are scheduled on the set of resources to perform the task for the virtual machine based on the set of priorities identified for the set of phases of the task.

22 Claims, 9 Drawing Sheets

TASK PRIORITIZATION MANAGEMENT IN A VIRTUALIZED ENVIRONMENT

BACKGROUND

1. Field

The disclosure relates generally to virtualization and more specifically to performing tasks for virtual machines in a virtualized environment.

2. Description of the Related Art

A virtual machine is a configuration of resources in a data processing system that operates as an individual computer. For example, the virtual machine may have its own operating system and software that runs applications for the virtual machine using the resources in the data processing system. In this manner, the virtual machine can appear to a user as an individual computer. However, the virtual machine may be one of several virtual machines that use the same resources in the data processing system.

A hypervisor is a layer of software that manages the virtual machine's use of the resources in the data processing system. The hypervisor operates in the data processing system and uses the resources of the data processing system to manage the virtual machine. For example, the hypervisor runs operating systems for the virtual machine. The hypervisor provides the virtual machine with a platform to access the resources. The hypervisor can also control the allocation of resources to a virtual machine. Overall, the hypervisor manages the virtualization of the resources providing a virtualized environment for the virtual machine.

As a virtual machine performs operations using the resources, tasks may need to be performed for the virtual machine. For example, applications of the virtual machines using the resources may need to be migrated from one data processing system to another data processing system. Because the hypervisor manages the virtual machine's use of the resources, this type of task is often performed by the hypervisor. The hypervisor performs tasks for the virtual machines using the resources of the data processing system. The use of the resources to perform the task for the virtual machine affects the availability of the resources in the data processing system.

Accordingly, it would be advantageous to have a method and system, which takes into account one or more of the issues discussed above as well as possibly other issues.

SUMMARY

The different illustrative embodiments provide a method, computer program product, and system for managing tasks for a virtual machine. In an illustrative embodiment, an amount of resources to perform a task for the virtual machine are identified in response to receiving a request to perform the task for the virtual machine in a set of data processing systems. A set of resources in the set of data processing systems available to complete the task for the virtual machine are identified. A set of priorities for a set of phases of the task are identified. Operations are scheduled on the set of resources to perform the task for the virtual machine based on the set of priorities identified for the set of phases of the task.

DETAILED DESCRIPTION

Figure 1:
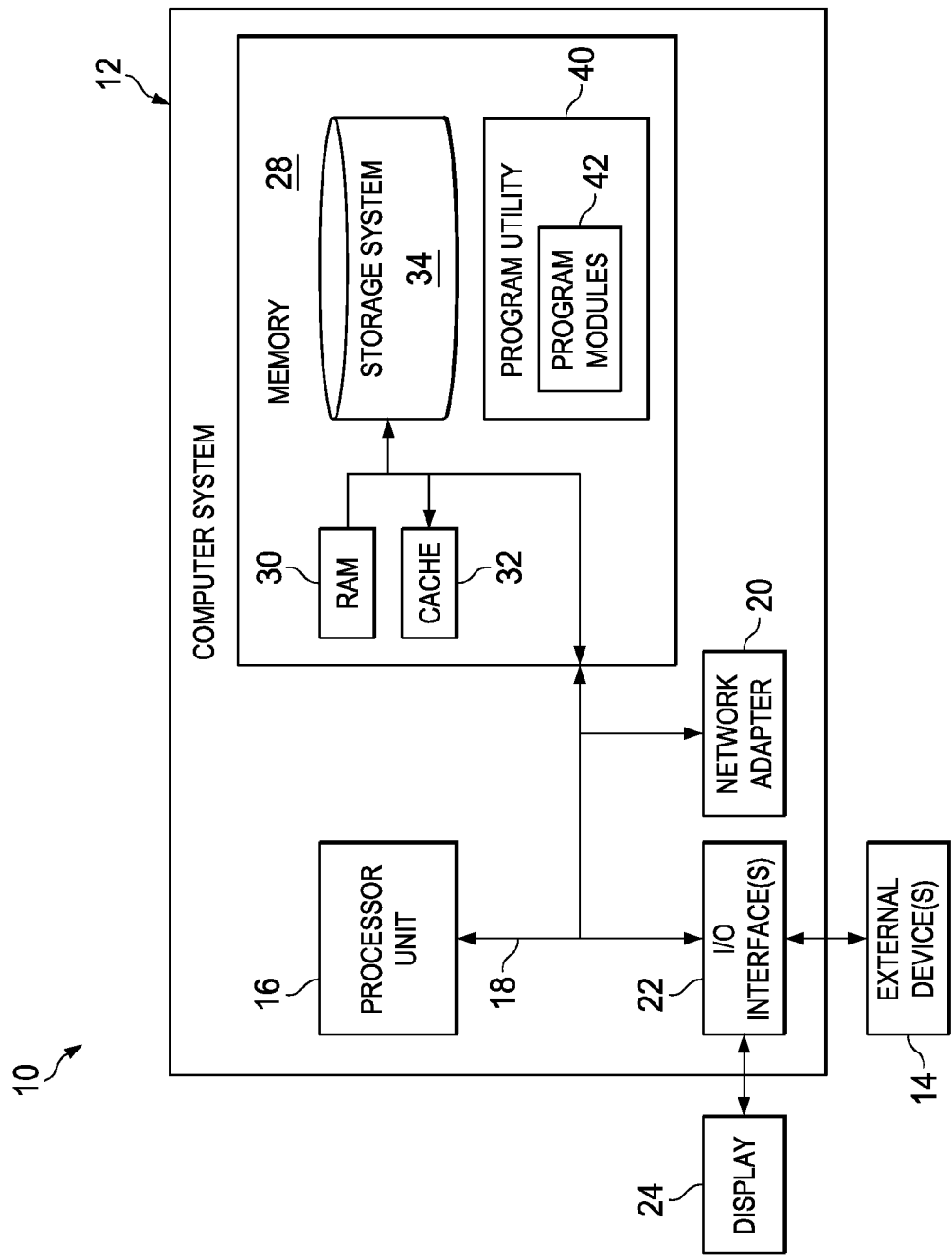
FIG. 1 is an illustration of a block diagram of a cloud computing node depicted in accordance with an illustrative embodiment.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

It is understood in advance that although this disclosure includes a detailed description on cloud computing, implementation of the teachings recited herein are not limited to a cloud computing environment. Rather, the illustrative embodiments are capable of being implemented in conjunction with any other type of computing environment now known or later developed.

For convenience, the Detailed Description includes the following definitions which have been derived from the "Draft NIST Working Definition of Cloud Computing" by Peter Mell and Tim Grance, dated Oct. 7, 2009, which is cited in an information disclosure statement filed herewith.

Cloud computing is a model of service delivery for enabling convenient, on-demand network access to a shared pool of configurable computing that can be rapidly provisioned and released with minimal management effort or interaction with a provider of the service. The computer resources, may be for example, resources networks, network bandwidth, servers, processing, memory, storage, applications, virtual machines, and services. This cloud model may include at least five characteristics, at least three service models, and at least four deployment models.

Characteristics include on-demand self-service, broad network access, resource pooling, rapid elasticity, and measured service. With on-demand self-service: a cloud consumer can unilaterally provision computing capabilities as needed automatically without requiring human interaction with the service's provider. The computer capabilities, include, for example, server time and network storage.

Broad network access involves capabilities that are available over a network and accessed through standard mechanisms that promote use by heterogeneous thin or thick client platforms, such as mobile phones, laptops, and personal digital assistants (PDAs). With resource pooling, the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction. The higher level of abstraction may be, for example, a country, state, or datacenter.

Rapid elasticity involves capabilities that can be rapidly and elastically provisioned, in some cases automatically, to quickly scale out and rapidly released to quickly scale in. To the consumer, the capabilities available for provisioning often appear to be unlimited and can be purchased in any quantity at any time.

With measured service, cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service models include, software as a service (SaaS), platform as a service (PaaS), and infrastructure as a service (IaaS). With software as a service (SaaS), a capability is to the consumer to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a service (PaaS) is a capability provided to the consumer is to deploy onto the cloud infrastructure consumer-created or acquired applications created using programming languages and tools supported by the provider. The consumer does not manage or control the underlying cloud infrastructure including networks, servers, operating systems, or storage. Instead, the consumer has control over the deployed applications and possibly application hosting environment configurations.

Infrastructure as a service (IaaS) is a capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components. These network components include, for example, host firewalls.

Deployment models include, for example, a private cloud, a community cloud, a public cloud, and a hybrid cloud. A private cloud has a cloud infrastructure that is operated solely for an organization. This type of cloud may be managed by the organization or a third party and may exist on-premises or off-premises.

Community cloud is the cloud infrastructure is shared by several organizations and supports a specific community that has shared concerns. These concerns include, for example, mission, security requirements, policy, and compliance considerations). A community cloud may be managed by the organizations or a third party. This type of cloud may exist on-premises or off-premises.

Public cloud: the cloud infrastructure is made available to the general public or a large industry group and is owned by an organization selling cloud services.

Hybrid cloud: the cloud infrastructure is a composition of two or more clouds. For example, without limitation, a hybrid cloud may be a combination of two or more of a private cloud, a community cloud, and public cloud. A hybrid cloud includes clouds that remain unique entities, but are bound together by standardized or proprietary technology that enables data and application portability. The data and application portability includes, for example, cloud bursting for load-balancing between clouds that form the hybrid cloud.

A cloud computing environment is service oriented with a focus on statelessness, low coupling, modularity, and semantic interoperability. At the heart of cloud computing is an infrastructure comprising a network of interconnected nodes.

With reference now to FIG. 1, a block diagram of an example of a cloud computing node is depicted in accordance with an illustrative embodiment. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system-executable instructions, such as program modules, being executed by a computer system. Generally, program modules may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system 12 in cloud computing node 10 is shown in the form of a general-purpose computing device. The components of computer system 12 may include, but are not limited to, one or more processors or processor unit 16, memory 28, and bus 18 that couples various system components including memory 28 to processor unit 16.

Processor unit 16 executes instructions for software that may be loaded into memory 28. Processor unit 16 may be a number of processors, a multi-processor core, or some other type of processor, depending on the particular implementation. A number, as used herein with reference to an item, means one or more items. Further, processor unit 16 may be implemented using a number of heterogeneous processor systems in which a main processor is present with secondary processors on a single chip. As another illustrative example, processor unit 16 may be a symmetric multi-processor system containing multiple processors of the same type.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

Memory 28 can include computer system readable media in the form of volatile memory, such as random access memory (RAM) 30 and/or cache 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set of program modules that are configured to carry out the functions of embodiments of the invention. As used herein, a set when referring to items means one or more items.

Program/utility 40, having a set of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system 12 may also communicate with one or more external devices 14 such as a keyboard, a pointing device, display 24, etc.; one or more devices that enable a user to interact with computer system 12; and/or any devices (e.g., network card, modem, etc.) that enable computer system 12 to communicate with one or more other computing devices. Such communication can occur via I/O interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processor units, external disk drive arrays, RAID systems, tape drives, and data archival storage systems, etc.

Figure 2:
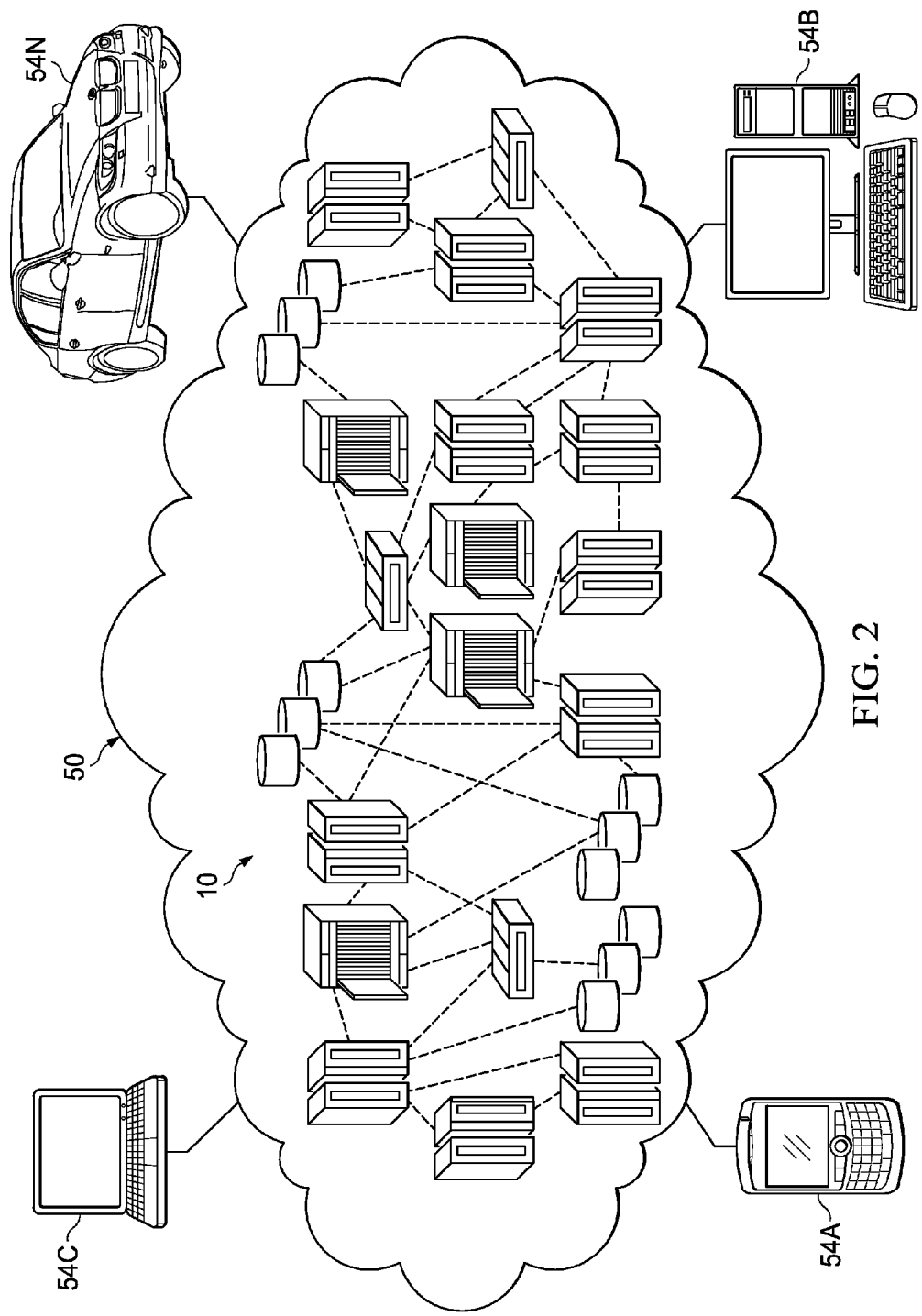
FIG. 2 is an illustration of a cloud computing environment depicted in accordance with an illustrative embodiment.

Referring now to FIG. 2, an illustration of a cloud computing environment is depicted in accordance with an illustrative embodiment. As illustrated, cloud computing environment 50 comprises one or more cloud computing nodes, such as cloud computing node 10 in FIG. 1. The one or more cloud computing nodes may communicate with local computing devices used by cloud consumers, such as, for example without limitation, personal digital assistant (PDA) or cellular telephone 54A, desktop computer 54B, laptop computer 54C, and/or automobile computer system 54N may communicate. Cloud computing node 10 may communicate with other cloud computing nodes. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser). Program code located on one of cloud computing nodes 10 may be stored on a computer recordable storage medium in one of cloud computing nodes 10 and downloaded to a computing device within computing devices 54A-N over a network for use in these computing devices. For example, a server computer in cloud computing nodes 10 may store program code on a computer readable storage medium on the server computer. The server computer may download the program code to a client computer in computing devices 54A-N for use on the client computer.

Figure 3:
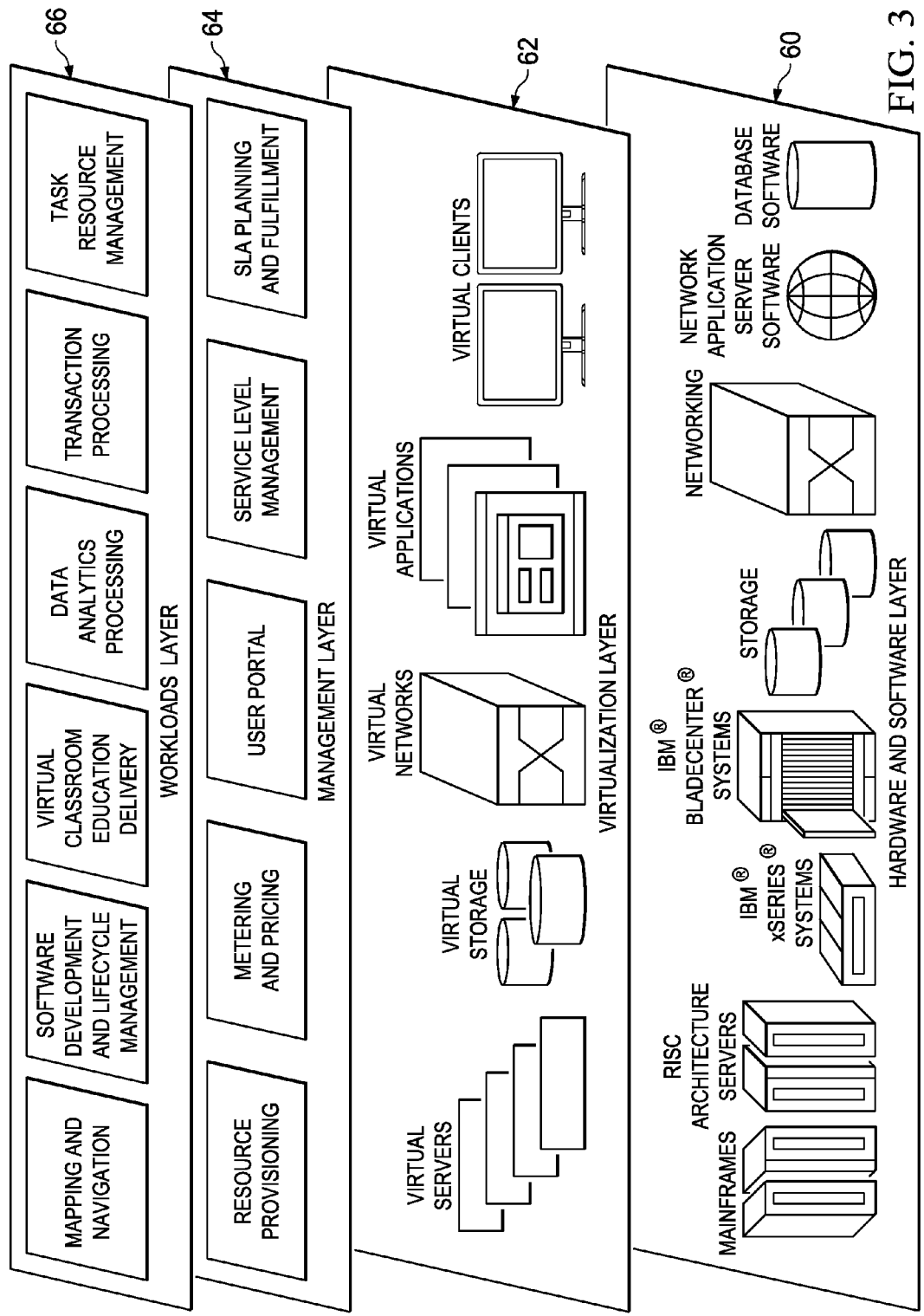
FIG. 3 is an illustration of model layers depicted in accordance with an illustrative embodiment.

With reference now to FIG. 3, an illustration of model layers are depicted in accordance with an illustrative embodiment. The model layers are a set of functional abstraction layers provided by a cloud computing environment, such as cloud computing environment 50 in FIG. 2. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide)

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and task resource management.

Figure 4:
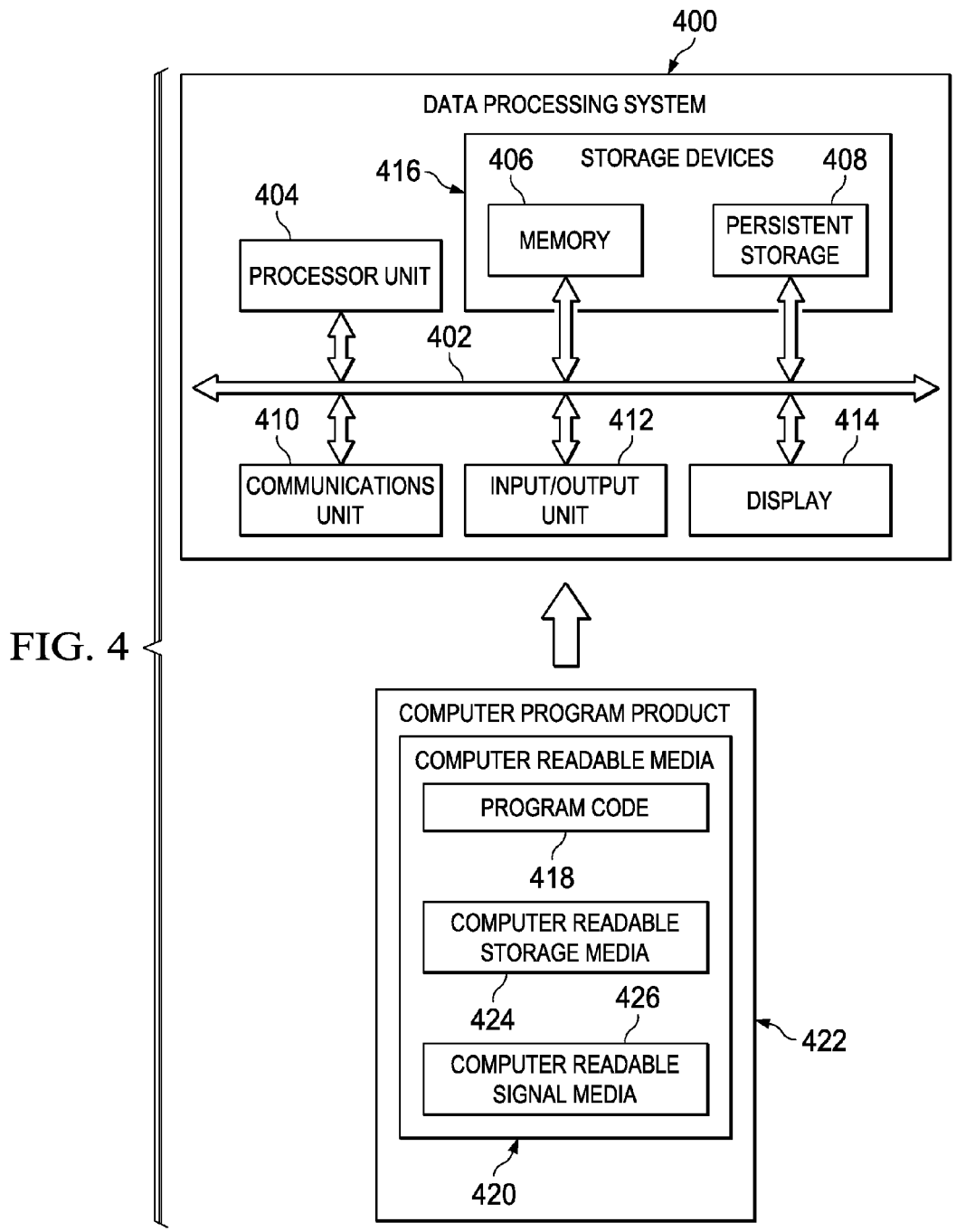
FIG. 4 is an illustration of a data processing system depicted in accordance with an illustrative embodiment.

Turning now to FIG. 4, a block diagram of a data processing system is depicted in accordance with an illustrative embodiment. In this illustrative example, data processing system 400 includes communications fabric 402, which provides communications between processor unit 404, memory 406, persistent storage 408, communications unit 410, input/output (I/O) unit 412, and display 414.

Processor unit 404 serves to execute instructions for software that may be loaded into memory 406. Processor unit 404 may be a number of processors, a multi-processor core, or some other type of processor, depending on the particular implementation. A number, as used herein with reference to an item, means one or more items. Further, processor unit 404 may be implemented using a number of heterogeneous processor systems in which a main processor is present with secondary processors on a single chip. As another illustrative example, processor unit 404 may be a symmetric multi-processor system containing multiple processors of the same type.

Memory 406 and persistent storage 408 are examples of storage devices 416. A storage device is any piece of hardware that is capable of storing information, such as, for example without limitation, data, program code in functional form, and/or other suitable information either on a temporary basis and/or a permanent basis. Memory 406, in these examples, may be, for example, a random access memory or any other suitable volatile or non-volatile storage device. Persistent storage 408 may take various forms depending on the particular implementation.

For example, persistent storage 408 may contain one or more components or devices. For example, persistent storage 408 may be a hard drive, a flash memory, a rewritable optical disk, a rewritable magnetic tape, or some combination of the above. The media used by persistent storage 408 also may be removable. For example, a removable hard drive may be used for persistent storage 408.

Communications unit 410, in these examples, provides for communications with other data processing systems or devices. In these examples, communications unit 410 is a network interface card. Communications unit 410 may provide communications through the use of either or both physical and wireless communications links.

Input/output unit 412 allows for input and output of data with other devices that may be connected to data processing system 400. For example, input/output unit 412 may provide a connection for user input through a keyboard, a mouse, and/or some other suitable input device. Further, input/output unit 412 may send output to a printer. Display 414 provides a mechanism to display information to a user.

Instructions for the operating system, applications and/or programs may be located in storage devices 416, which are in communication with processor unit 404 through communications fabric 402. In these illustrative examples the instructions are in a functional form on persistent storage 408. These instructions may be loaded into memory 406 for execution by processor unit 404. The processes of the different embodiments may be performed by processor unit 404 using computer implemented instructions, which may be located in a memory, such as memory 406.

These instructions are referred to as program code, computer usable program code, or computer readable program code that may be read and executed by a processor in processor unit 404. The program code in the different embodiments may be embodied on different physical or tangible computer readable media, such as memory 406 or persistent storage 408.

Program code 418 is located in a functional form on computer readable media 420 that is selectively removable and may be loaded onto or transferred to data processing system 400 for execution by processor unit 404. Program code 418 and computer readable media 420 form computer program product 422 in these examples. In one example, computer readable media 420 may be computer readable storage media 424 or computer readable signal media 426. Computer readable storage media 424 may include, for example, an optical or magnetic disk that is inserted or placed into a drive or other device that is part of persistent storage 408 for transfer onto a storage device, such as a hard drive, that is part of persistent storage 408. Computer readable storage media 424 also may take the form of a persistent storage, such as a hard drive, a thumb drive, or a flash memory, that is connected to data processing system 400. In some instances, computer readable storage media 424 may not be removable from data processing system 400. In these illustrative examples, computer readable storage media 424 is a non-transitory computer readable storage medium.

Alternatively, program code 418 may be transferred to data processing system 400 using computer readable signal media 426. Computer readable signal media 426 may be, for example, a propagated data signal containing program code 418. For example, computer readable signal media 426 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 418 may be downloaded over a network to persistent storage 408 from another device or data processing system through computer readable signal media 426 for use within data processing system 400. For instance, program code stored in a computer readable storage medium in a server data processing system may be downloaded over a network from the server to data processing system 400. The data processing system providing program code 418 may be a server computer, a client computer, or some other device capable of storing and transmitting program code 418.

The different components illustrated for data processing system 400 are not meant to provide architectural limitations to the manner in which different embodiments may be implemented. The different illustrative embodiments may be implemented in a data processing system including components in addition to or in place of those illustrated for data processing system 400. Other components shown in FIG. 4 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, processor unit 404 may take the form of a hardware unit that has circuits that are manufactured or configured for a particular use. This type of hardware may perform operations without needing program code to be loaded into a memory from a storage device to be configured to perform the operations.

For example, when processor unit 404 takes the form of a hardware unit, processor unit 404 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, programmable array logic, a field programmable logic array, a field programmable gate array, and other suitable hardware devices. With this type of implementation, program code 418 may be omitted because the processes for the different embodiments are implemented in a hardware unit.

In still another illustrative example, processor unit 404 may be implemented using a combination of processors found in computers and hardware units. Processor unit 404 may have a number of hardware units and a number of processors that are configured to run program code 418. With this depicted example, some of the processes may be implemented in the number of hardware units, while other processes may be implemented in the number of processors.

As another example, a storage device in data processing system 400 is any hardware apparatus that may store data. Memory 406, persistent storage 408, and computer readable media 420 are examples of storage devices in a tangible form.

In another example, a bus system may be used to implement communications fabric 402 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 406, or a cache, such as found in an interface and memory controller hub that may be present in communications fabric 402.

As another example, a storage device in data processing system 400 is any hardware apparatus that may store data. Memory 406, persistent storage 408, and computer readable media 420 are examples of storage devices in a tangible form.

In another example, a bus system may be used to implement communications fabric 402 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 406, or a cache such as found in an interface and memory controller hub that may be present in communications fabric 402.

The different illustrative embodiments recognize and take into account a number of different considerations. For example, the different illustrative embodiments recognize that performing a task for virtual machine uses resources that may be shared in a data processing system. Performing the task uses resources that may be allocated to other virtual machines and/or the hypervisor. This use of resources can slow the performance of other virtual machines that share the resources in the data processing system.

The different illustrative embodiments recognize and take into account that one solution may involve specifying a priority for a task of migrating a virtual machine. The task of migrating a virtual machine may be given different priorities. However, many tasks performed for a virtual machine occur automatically. The tasks may need to be identified and have resources allocated to perform the task. Further, different priorities may be desired for different types of tasks. For example, tasks such as backing up data for a virtual machine can be performed over a longer period of time. On the other hand, migrating a virtual machine may be desired to occur over a shorter period of time.

Additionally, the different illustrative embodiments recognize that different phases of the task may use more resources than other phases. Some phases of the task may be more important to have completed sooner than other phases. For example, while migrating a virtual machine, phases related to copying data or copying the virtual machine to the recipient data processing system may have a lower priority. However, phases related to terminating the virtual machine on the initial data processing system and restarting the virtual machine on the recipient data processing system may be desired to have a higher priority.

The different illustrative embodiments further recognize that when managing tasks for virtual machines multiple data processing systems and multiple hypervisors may be involved. For example, a virtual machine implemented in a cloud computing environment may use resources from different cloud computing nodes in the cloud computing environment. Management of tasks for the virtual machine may require communication between more than one hypervisor and implementation of priorities for the tasks in more than one cloud computing node.

Thus, the different illustrative embodiments provide a method, computer program product, and system for managing tasks for a virtual machine. In an illustrative embodiment, an amount of resources to perform a task for the virtual machine are identified in response to receiving a request to perform the task for the virtual machine in a set of data processing systems. A set of resources in the set of data processing systems available to complete the task for the virtual machine are identified. A set of priorities for a set of phases of the task are identified. Operations are scheduled on the set of resources to perform the task for the virtual machine based on the set of priorities identified for the set of phases of the task.

Figure 5:
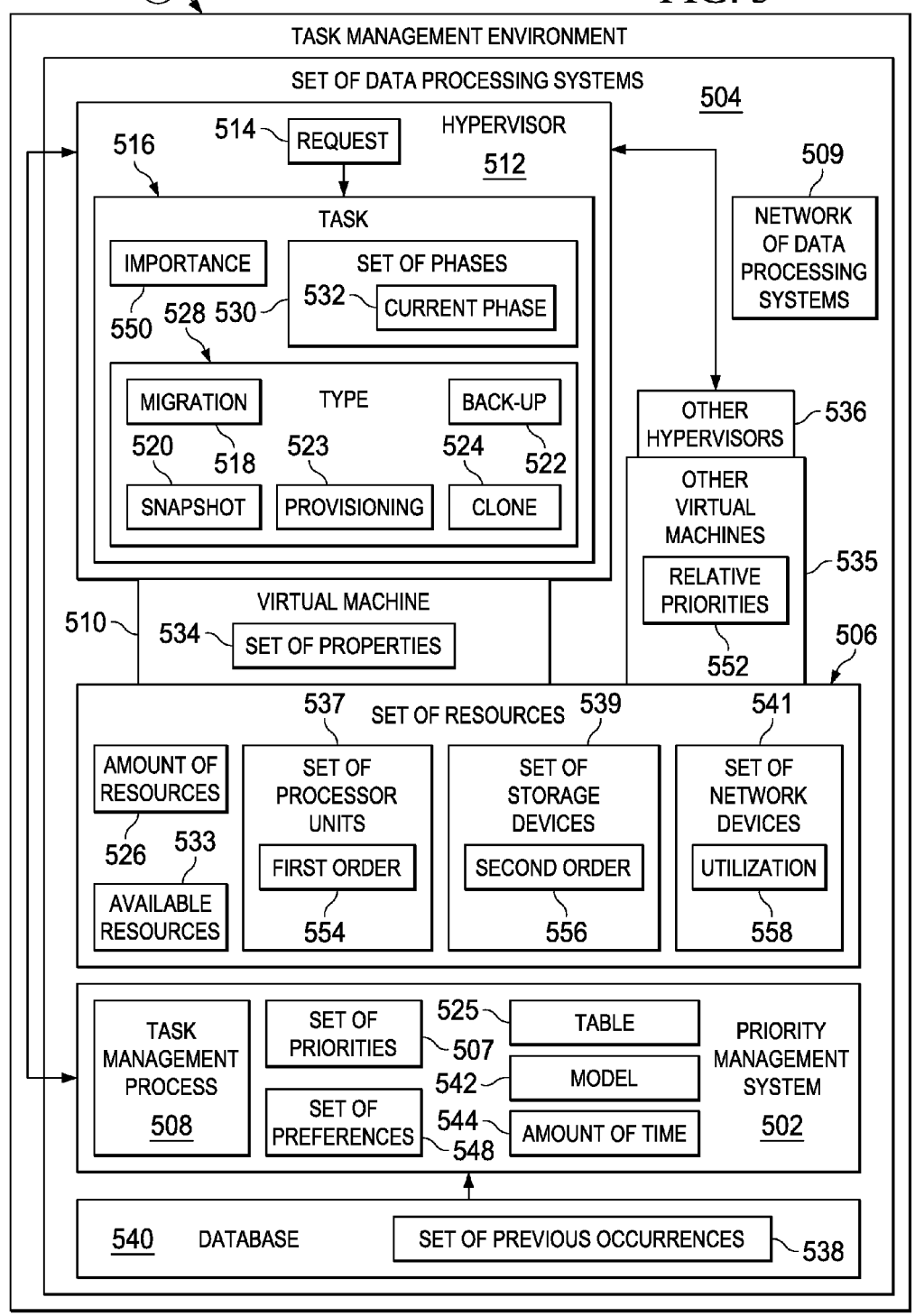
FIG. 5 is an illustration of a block diagram of a task management environment depicted in accordance with an illustrative embodiment.

With reference now to FIG. 5, an illustration of a block diagram of a task management environment is depicted in accordance with an illustrative embodiment. Task management environment 500 is an environment in which illustrative embodiments may be implemented. In these illustrative embodiments, task management environment 500 may be implemented in a cloud computing environment such as cloud computing environment 50 in FIG. 2.

Task management environment 500 includes priority management system 502 and set of data processing systems 504. Priority management system 502 manages the use of set of resources 506 in set of data processing systems 504. For example, priority management system 502 identifies set of priorities 507 for the use of set of resources 506. Additionally, task management process 508 runs in priority management system 502 and manages tasks that use resources in set of resources 506.

Set of data processing systems 504 may be a single data processing system such as data processing system 400 in FIG. 4. Set of data processing systems 504 may also be a network of data processing systems 509 in a cloud computing environment such as cloud computing environment 50 in FIG. 2.

As depicted, set of data processing systems 504 includes virtual machine 510. Virtual machine 510 is a configuration of resources in set of data processing systems 504 that operates as an individual computer. For example, virtual machine 510 may be implemented in set of data processing systems 504 and/or use resources in set of resources 506. Set of data processing systems 504 further includes hypervisor 512. Hypervisor 512 may run an operating system for virtual machine 510 and provide access to set of resources 506.

In these illustrative examples, hypervisor 512 receives request 514 to perform task 516 for virtual machine 510. Task 516 is a management task to be performed by hypervisor 512 in managing virtual machine 510. For example, without limitation, task 516 may be a management task of migration 518 of virtual machine 510 from one data processing system in set of data processing systems 504 to another data processing system in set of data processing systems 504. Task 516 may be a management task of recording and storing snapshot 520 of virtual machine 510. Task 516 may be a management task of back-up 522 of data stored by virtual machine 510. Task 516 may also be a management task of provisioning 523 resources in set of resources 506 for virtual machine 510. In another example, task 516 may also be a management task of creating clone 524 of virtual machine 510 to be started in set of data processing systems 504.

When hypervisor 512 receives request 514, task management process 508 places task 516 into table 525. Table 525 maintains information regarding task 516. For example, table 525 includes information regarding set of priorities 507 for performing task 516. Table 525 may also include information regarding amount of resources 526 in set of resources 506 that are needed to complete task 516.

In these illustrative examples, task management process 508 identifies amount of resources 526 in set of resources 506 that are needed to complete task 516. Task management process 508 identifies type 528 of task 516. The type of task 528 is used to identify amount of resources 526.

As discussed above, type 528 of task 516 may include for example, without limitation, migration 518, snapshot 520, back-up 522, provisioning 523, clone 524, and/or any other suitable tasks to be performed by hypervisor 512 for virtual machine 510. Task management process 508 further identifies set of phases 530 of task 516 as well as current phase 532. For example, task 516 may have multiple phases in set of phases 530 to complete task 516. Task management process 508 may continually monitor the completion phases in set of phases 530 to update current phase 532.

Task management process 508 further identifies set of properties 534 of virtual machine 510. Set of properties 534 may include physical characteristics of virtual machine 510 such as, for example, without limitation, a size of virtual machine 510, an amount of data stored by virtual machine 510, and/or a number of operations performed by virtual machine 510. Set of properties 534 may also include information about expectations or standards for virtual machine 510. For example, an individual using virtual machine 510 may expect or have purchased a certain amount of processing capability and/or network connection.

Task management process 508 further identifies available resources 533 in set of resources 506 that are available to perform task 516. For example, set of resources 506 may be a pool of resources shared among other virtual machines 535 in set of data processing systems 504. Resources in set of resources 506 may be allocated to or be in use by virtual machine 510 and other virtual machines 535 in set of data processing systems 504. In some illustrative examples, set of data processing systems 504 may be a single data processing system with just hypervisor 512. Hypervisor 512 may maintain and identify information about available resources 533 in set of resources 506. In other examples, set of data processing systems 504 may be network of data processing systems 509 with other hypervisors 536 in addition to hypervisor 512. Task management process 508 may identify available resources 533 by communicating with hypervisor 512 and other hypervisors 536 in set of data processing systems 504.

In these illustrative examples, set of resources 506 are resources that can be used by virtual machine 510 in set of data processing systems 504. For example, without limitation, set of resources 506 may include set of processor units 537, set of storage devices 539, set of network devices 541, a bus system, input/output devices, and/or any other resources that may be used by virtual machine 510. Set of storage devices 539 may include storage devices such as storage devices 416 in FIG. 4. Set of network devices 541 may include communications units such as communications unit 410 in FIG. 4.

Additionally, task management process 508 may retrieve set of previous occurrences 538 in identifying amount of resources 526 in set of resources 506 that are needed to complete task 516. Set of previous occurrences 538 includes data regarding previous occurrences of task 516 in set of data processing systems 504. For example, when tasks are performed for one or more of virtual machine 510 and other virtual machines 535 data regarding resources used and time the resources were used is stored in database 540.

Task management process 508 can search database 540 for occurrences in the set of previous occurrences 538 that are similar to task 516. Occurrences that are similar can mean a task of a same type. For example, task management process 508 may retrieve occurrences of a previous task having a same type as type 528 of task 516. Occurrences that are similar may also mean tasks previously performed for virtual machine 510. Task management process 508 may also retrieve previous occurrences of a task performed for virtual machine 510 and/or other virtual machines 535 having properties similar to set of properties 534 of virtual machine 510.

Task management process 508 then generates model 542 of the completion of set of phases 530 of task 516. For example, task management process 508 may use data from set of previous occurrences 538 of task 516 for virtual machine 510 to identify amount of resources 526 needed to complete task 516. Task management process 508 may also use set of properties 534 of virtual machine 510 in identifying amount of resources 526 needed to complete task 516. For example, if data in virtual machine 510 needs to be copied to perform task 516, task management process 508 may identify the amount of data that needs to be copied. The amount of data that needs to be copied is used to identify amount of resources 526 needed to complete task 516.

Task management process 508 generates model 542 of resource usage over time based on available resources 533 and amount of resources 526 needed to complete task 516. Using model 542, task management process 508 can identify types of resources needed to complete task 516 as well as amount of time 544 amount of resources 526 will be needed to complete task 516. For example, model 542 includes predictions of steps that will be performed to complete task 516. If task 516 involves copying data stored in memory, then task management process 508 can identify that set of storage devices 539 and input/output devices will be necessary. In another example, if task 516 involves restarting applications and transferring data from one data processing system to another, then task management process 508 can identify that set of processor units 537 and set of network devices 541 will be necessary. Additionally, model 542 shows the use of resources over time to complete task 516.

As discussed above, priority management system 502 identifies set of priorities 507 in set of data processing systems 504. For example, other virtual machines 535 in addition to virtual machine 510 may use resources in set of resources 506. Further, other hypervisors 536 in addition to hypervisor 512 may use set of resources 506 to perform management tasks. Performing task 516 using set of resources 506 may affect the availability of resources in set of resources 506. Thus, priority management system 502 identifies set of priorities 507 for performing task 516 for virtual machine 510.

In order to identify set of priorities 507, task management process 508 identifies type 528 of task 516 and set of properties 534 of virtual machine 510 as discussed above. Task management process 508 stores type 528 and set of properties 534 in table 525 in priority management system 502. Task management process 508 retrieves set of preferences 548 for task 516 and stores set of preferences 548 in table 525.

Set of preferences 548 includes preferences for the completion of task 516. For example, set of preferences 548 may include user preferences regarding amount of time 544 and amount of resources 526 used to complete task 516. Set of preferences 548 may also include information from set of previous occurrences 538. For example, a task of a same type as type 528 of task 516 may have been performed for virtual machine 510. Set of preferences 548 may include a preference to have task 516 completed in a similar manner.

In identifying set of priorities 507, task management process 508 also identifies importance 550 of task 516. For example, certain tasks such as back-up 522, for example, may be less important than other tasks. Back-up 522 may be performed over a period of hours. On the other hand, snapshot 520 may occur over a shorter period of time to insure consistency between snapshots. Further, different tasks of a same type may have different importance 550. For example, tasks for applications running on virtual machine 510 that are related to testing or development may be less important than tasks for applications that are crucial to business operations. In some examples, importance 550 may be included in set of preferences 548 for task 516. In other examples, task management process 508 may identify importance of task 516 based on type 528 of task 516.

Task management process 508 also identifies importance 550 of each phase of in set of phases 530 of task 516. Some phases of task 516 may be more important that other phases. For example, if task 516 is migration 518, the phases related to copying of virtual machine 510 on a recipient data processing system may be less important. The portions of the virtual machine may be moved as resources become available. The phases related to stopping of virtual machine 510 on the initial data processing system and restarting the virtual machine on a recipient data processing system may be more important. The phases of stopping of virtual machine 510 on the initial data processing system and restarting the virtual machine on a recipient data processing system may be referred to as cut-over phases of migration 518. For example, restarting a virtual machine takes time. If resources are not available during the cut-over phases of migration 518, the time to restart may take longer. Applications and data from the virtual machine may be unavailable for extended periods of time during the cut-over phases of the migration. Thus, the priority of certain phases of task 516 may be higher than other phases.

Also in identifying set of priorities 507, task management process 508 identifies relative priorities 552 among virtual machine 510 and other virtual machines 534 in set of data processing systems 504. As discussed above, performing task 516 may use resources use resources in set of resources 506 that are used by other virtual machines 534. Performing task 516 may have an effect on other virtual machines 534 in set of data processing systems 504. In identifying relative priorities 552, task management process 508 looks at the priorities of other virtual machines 535 as compared with virtual machine 510. For example, other virtual machines 535 may have expectations of resource availability. Resources in set of resources 506 may be allocated to other virtual machines 535 for periods of time. In another example, other virtual machines 535 may have priority to access resources in set of resources 506 over virtual machine 510. For example, other virtual machines 535 may be performing operations that are crucial for business reasons and may not be desired to be affected by task 516.

Task management process 508 stores importance 550 of task 516 and relative priorities 552 in table 525. As discussed above, task management process 508 identifies available resources 533 in set of resources 506 available to complete task 516. Task management process 508 also generates model 542 of completion of task 516. Task management process 508 may also store information regarding available resources 533 and model 542 in table 525.

Based on the information stored in table 525, task management process 508 assigns set of priorities 507 to task 516. For example, different priorities in set of priorities 507 may be assigned to different phases of task 516. The priority of each phase may be assigned before the phase is started or as task 516 is being completed. For example, task management process 508 may monitor and update information regarding current phase 532 of task 516, importance 550, relative priorities 552, and available resources 533 as hypervisor 512 performs task 516. If information changes, task management process 508 may increase or decrease priorities in set of priorities 507. For example, if available resources 533 in set of resources 506 decreases, priorities in set of priorities 507 may be increased to meet preferences in set of preferences 548. In another example, task management process 508 may receive updated information regarding importance 550 of task 516, set of preferences 548, and/or relative priorities 552.

Once set of priorities 507 has been assigned, priority management system 502 implements set of priorities 507 in set of data processing systems 504. For example, task management process 508 may manage first order 554 of operations performed by set of processor units 537 in set of resources 506. A schedule of operations for performing current phase 532 of task 516 may be modified in first order 554 based on the priority of current phase 532 in set of priorities 507. Operations associated with task 516 may be scheduled to be performed by set of processor units 537 based on set of priorities 507. In another example, task management process 508 may manage second order 556 of data to be read from and/or written to set of storage devices 539 based on set of priorities 507. In other examples, task management process 508 may manage utilization 558 of set of network devices 541 in performing task 516 based on set of priorities 507.

In some illustrative embodiments, task management process 508 may allocate and de-allocate resources to hypervisor 512 to perform task 516 for virtual machine 510. Task management process 508 may allocate and de-allocate resources based on the priority in set of priorities 507 for current phase 532 of task 516.

While hypervisor 512 performs task 516 for virtual machine 510, task management process 508 monitors results of performing task 516. For example, task management process 508 may monitor current phase 532 and adjust priority of task 516 when current phase 532 changes. Task management process 508 also monitors performance of task 516 to identify whether task 516 is being completed according to set of preferences 548. If task 516 is not being completed according to preferences, task management process 508 may increase priorities in set of priorities 507. Further, task management process 508 monitors task 516 to update model 542. For example, task management process 508 may store data regarding amount of resources 526 and amount of time 544 used to complete task 516 in set of previous occurrences 538 in a database for later use.

The illustration of task management environment 500 in FIG. 5 is not meant to imply physical or architectural limitations to the manner in which different features may be implemented. Other components in addition to and/or in place of the ones illustrated may be used. Some components may be unnecessary in some illustrative embodiments. Also, the blocks are presented to illustrate some functional components. One or more of these blocks may be combined and/or divided into different blocks when implemented in different illustrative embodiments.

For example, without limitation, in some illustrative embodiments, priority management system 502 may be an application that runs in set of data processing systems 504. Task management process 508 may be a thread of priority management system 502. In other illustrative embodiments, priority management system 502 may be a separate data processing system that supervises set of data processing systems 504 and establishes priority schemes for the use of set of resources 506.

In other illustrative embodiments, set of resources 506 may be a pool of resources from multiple cloud computing nodes. Set of resources 506 may also be the resources of a single computer. In yet other illustrative embodiments, hypervisor 512 may be the only hypervisor in set of data processing systems 504. Hypervisor 512 may manage virtual machine 510 and other virtual machines 535 in set of data processing system 504.

Figure 6:
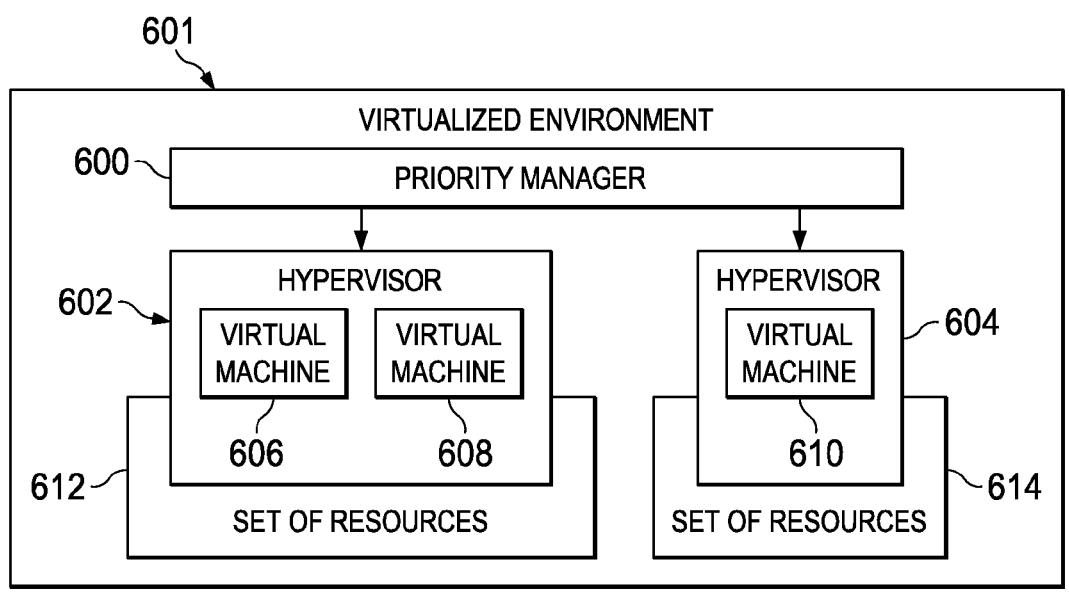
FIG. 6 is an illustration of a block diagram of a priority manager depicted in accordance with an illustrative embodiment.

With reference now to FIG. 6, an illustration of a block diagram of a priority manager is depicted in accordance with an illustrative embodiment. In these illustrative examples, priority manager 600 is an example of one implementation of priority management system 502 in FIG. 5. Priority manager 600 is implemented in virtualized environment 601.

In these illustrative examples, priority manager 600 manages tasks performed by hypervisors 602 and 604 for virtual machines 606, 608, and 610. Hypervisor 602 manages virtual machines 606 and 608 and provides virtual machines 606 and 608 access to set of resources 612. Hypervisor 604 manages virtual machine 610 and provides virtual machine 610 access to set of resources 614.

In these illustrative examples, when a request to perform a task for one of virtual machines 606, 608, and 610 is received, priority manager 600 identifies information about the task and objects in virtualized environment 601. For example, priority manager 600 may receive information about a type of the task and an importance of the task. In other examples, priority manager 600 communicates with hypervisors 602 and 604 to identify information about virtual machines 606, 608, and 610 as well as sets of resources 612 and 614. Thus, priority manager 600 may be a centralized server that communicates with hypervisors 602 and 604 to manage prioritization of tasks in virtualized environment 601.

The illustration of priority manager 600 in FIG. 6 is not meant to imply physical or architectural limitations to the manner in which different features may be implemented. Other components in addition to and/or in place of the ones illustrated may be used. Some components may be unnecessary in some illustrative embodiments. Also, the blocks are presented to illustrate some functional components. One or more of these blocks may be combined and/or divided into different blocks when implemented in different illustrative embodiments.

For example, in some illustrative embodiments, virtualized environment 601 may be a cloud computing environment, such as cloud computing environment 50 in FIG. 2. Sets of resources 612 and 614 may be cloud computing nodes, such as cloud computing node 10 in FIG. 2. Thus, priority manager 600 may communicate with hypervisors 602 and 604 distributed in a cloud computing environment. Priority manager 600 can identify a current availability of all the resources in the cloud computing environment in assigning priorities to the task. Further, priority manager 600 can identify resources in the cloud computing environment from different cloud computing nodes to perform the task.

In other illustrative embodiments, priority manager 600 may communicate with peer priority managers to identify other resources that may be available to perform the management task. For example, different sets of resources may have different priority managers that manage the priorities of task performed using the different sets of resources. Priority manager 600 may assign the priority of the management task by communicating with the peer priority managers.

Figure 7:
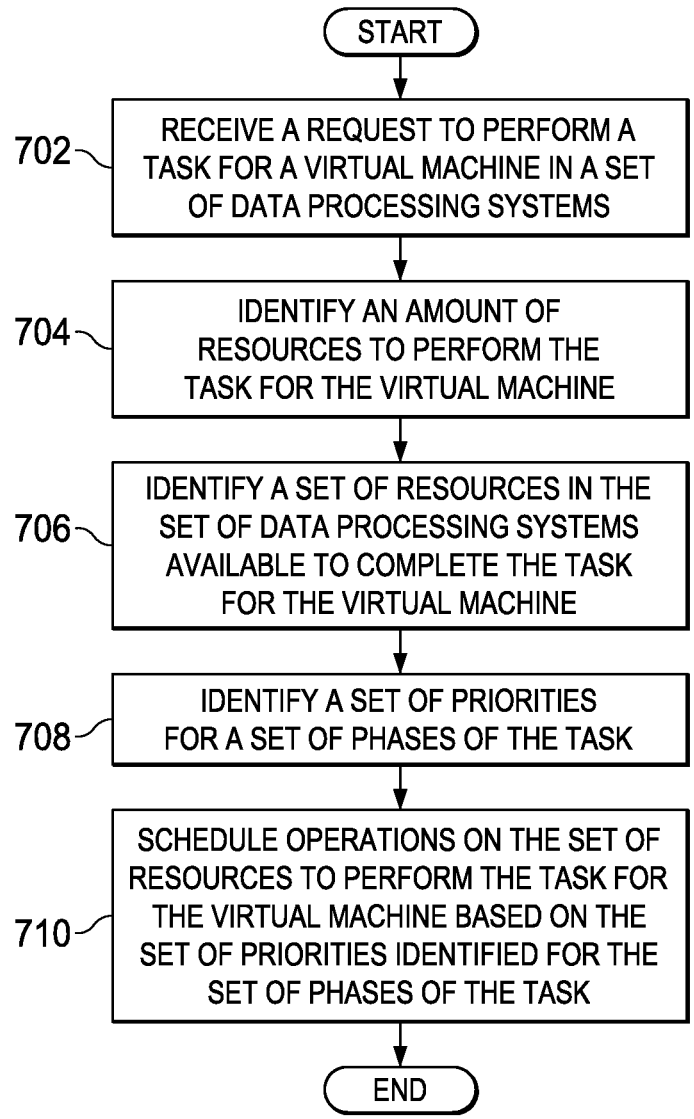
FIG. 7 is a flowchart of a process for managing a task for a virtual machine depicted in accordance with an illustrative embodiment.

With reference now to FIG. 7, a flowchart of a process for managing tasks for a virtual machine is depicted in accordance with an illustrative embodiment. The process may be performed by task management process 508 running in priority management system 502 in FIG. 5.

The process begins by receiving a request to perform a task for a virtual machine in a set of data processing systems (step 702). The process then identifies an amount of resources to perform the task for the virtual machine (step 704). In step 704, the request may be received by a hypervisor such as hypervisor 512 in FIG. 5, for example. The process then identifies a set of resources in the set of data processing systems available to complete the task for the virtual machine (step 706).

Thereafter the process identifies a set of priorities for a set of phases of the task (step 708), relative to other tasks in the set of data processing systems. In step 708, different phases may be assigned different priorities. In step 708, the priorities of existing tasks in the system may also be adjusted to accommodate the requested task. The process then schedules operations on the set of resources to perform the task for the virtual machine and the existing tasks in the system based on the set of priorities identified for the set of phases of the task (step 710), with the process terminating thereafter. In step 710, the operations may be scheduled on processor units, and/or storage devices and utilize network devices. The order in which the operations are scheduled and amount of utilization of the network devices is based on the set of priorities for the for the set of phases of the task.

Figure 8:
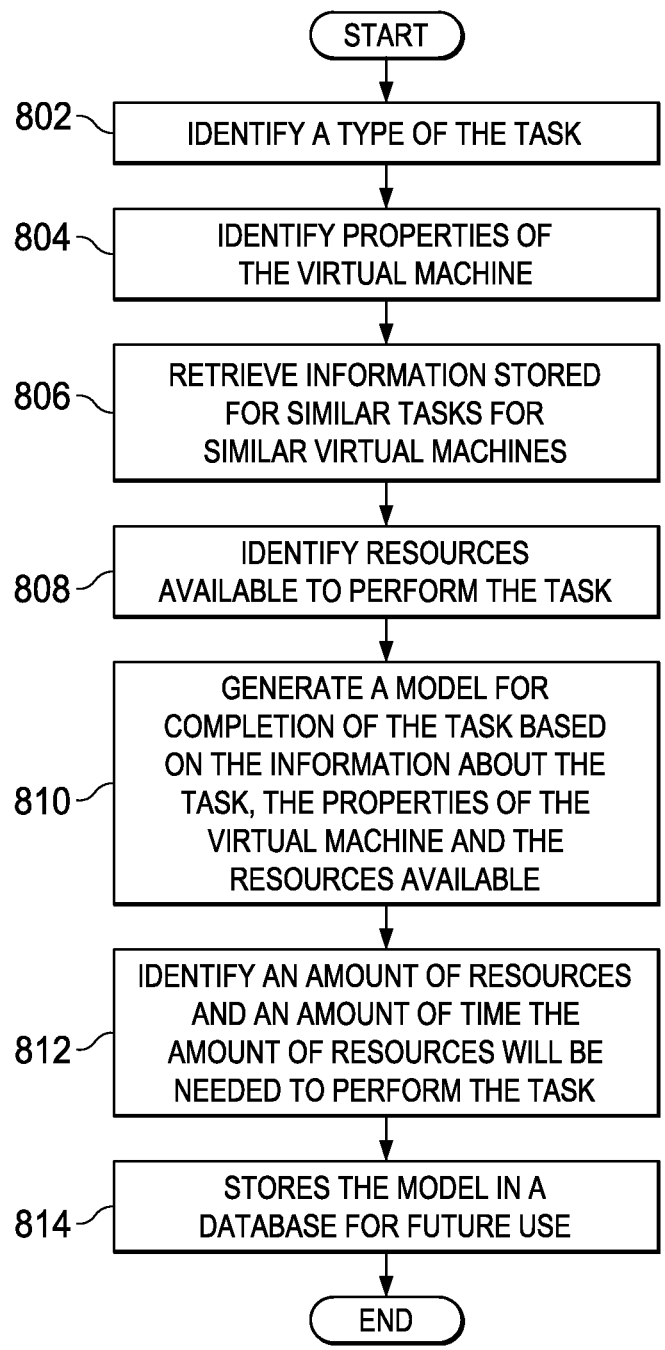
FIG. 8 is a flowchart of a process for generating a model for completion of a task depicted in accordance with an illustrative embodiment.

With reference now to FIG. 8, a flowchart of a process for generating a model for completion of a task is depicted in accordance with an illustrative embodiment. The process may be performed by task management process 508 running in priority management system 502 in FIG. 5.

The process begins by identifying a type of the task (step 802). In step 802, the task may be a management task performed by a hypervisor for the virtual machine. The process then identifies properties of the virtual machine (step 804). In step 804, the properties identified may be set of properties 534 in FIG. 5. Thereafter, the process retrieves information stored for similar tasks for similar virtual machines (step 806). In step 806, the information retrieved may be set of previous occurrences 538 in FIG. 5 of tasks performed for the virtual machine and having a same type as the task. The process then identifies resources available to perform the task (step 808).

Thereafter, the process generates a model for completion of the task based on the information about the task, the properties of the virtual machine, and the resources available (step 810). In step 810, the model generated may be generated as model 542 in FIG. 5. The process then identifies an amount of resources and an amount of time the amount of resources will be needed to perform the task (step 812). In step 812, the process identifies the amount of resources and the amount of time using the model. Thereafter, the process stores the model in a database for future use (step 814), with the process terminating thereafter. In step 814, information from the model may be included in a table such as table 525 in FIG. 5. The model may be used to identify priorities for completion of the task.

Figure 9:
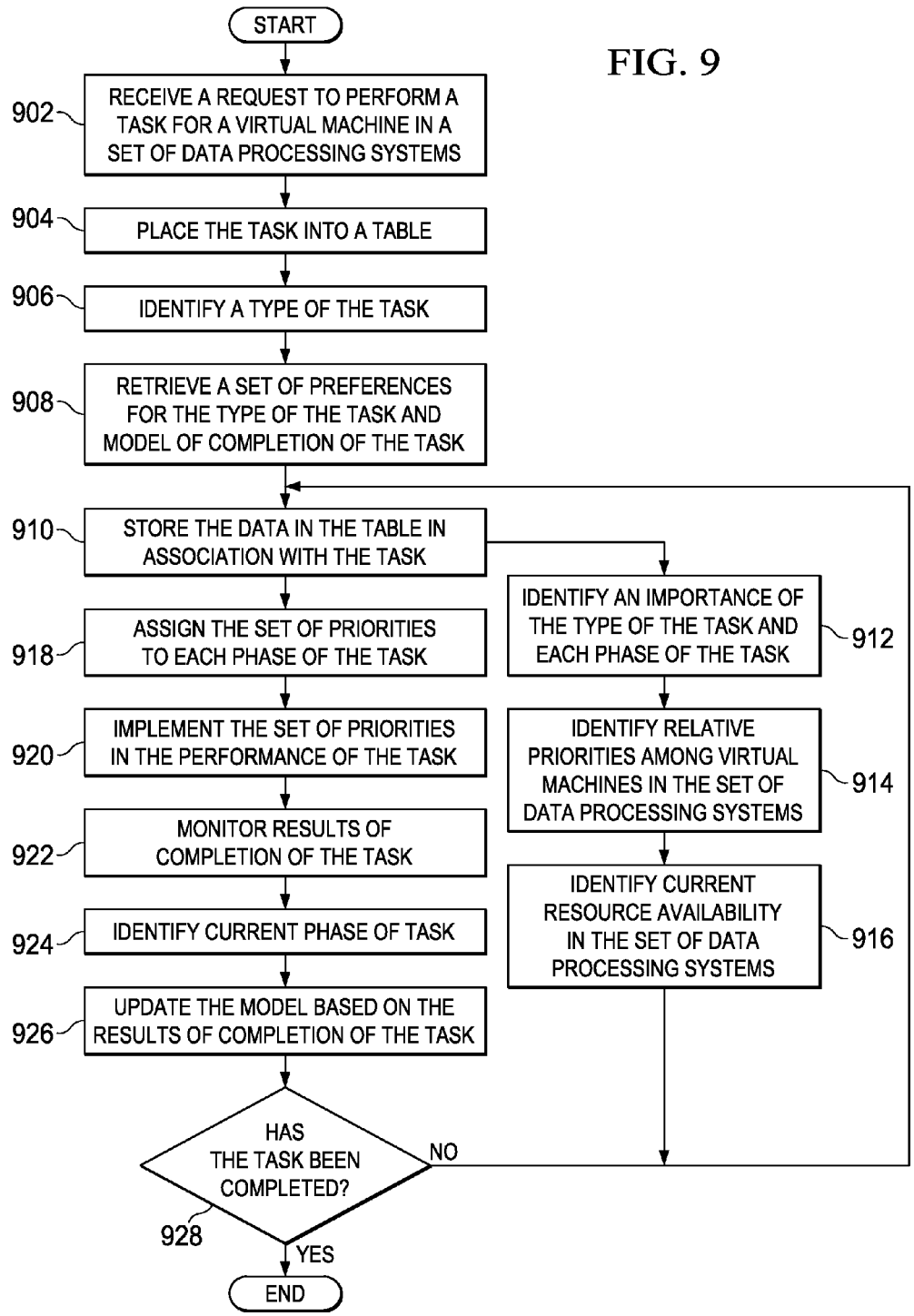
FIG. 9 is a flowchart of a process for identifying a set of priorities for a task depicted in accordance with an illustrative embodiment.

With reference now to FIG. 9, a flowchart of a process for identifying a set of priorities for a task is depicted in accordance with an illustrative embodiment. The process may be performed by task management process 508 running in priority management system 502 in FIG. 5. The process may also be performed by priority manager 600 in FIG. 6.

The process begins by receiving a request to perform a task for a virtual machine in a set of data processing systems (step 902). The process then places the task into a table (step 904). In step 904, the table includes information about task for identifying priorities for performing the task such as table 525 in FIG. 5, for example. Thereafter, the process identifies a type of the task (step 906). The process then retrieves a set of preferences for the type of the task and model of completion of the task (step 908). In step 908, the model may have been generated by a process such as step 810 in FIG. 8, for example. Thereafter, the process stores the data in the table in association with the task (step 910).

The process then identifies an importance of the type of the task and each phase of the task (step 912). Thereafter the process identifies relative priorities among virtual machines in the set of data processing systems (step 914). The process then identifies current resource availability in the set of data processing systems (step 916). Thereafter, the process returns to step 910 and stores the data in the table in association with the task.

The process then assigns the set of priorities to each phase of the task (step 918). In step 918, the set of priorities are assigned based on the information in the table. In some embodiments, step 918 may be performed without having performing steps 912-916. For example, the set of priorities may be assigned based on the type of the task, the set of preferences, and the model of completion of the task. In other examples, data from steps 912-916 may be included in the table and used in assigning the set of priorities. Further, steps 912-916 may run as a loop and monitor for updated information. If updated information is obtained after the set of priorities have been assigned, the process may promote or demote phases of the task by assign new priorities in step 918.

The process then implements the set of the priorities in the performance of the task (step 920). In step 920, performance of the task may have already been started. Whether or not the performance has been started, the set of priorities may be implemented by managing schedules for the resources in the data processing system. Thereafter, the process monitors results of completion of the task (step 922). Thereafter, the process identifies a current phase of the task (step 924). The process updates the model based on the results of completion of the task (step 926). The process then determines whether the task has been completed (step 928). If the task has been completed the process terminates. If the process has not been completed the process returns to step 910 and stores the data in the table in association with the task. Steps 922-926 may run as a loop and monitor the results while the task is being performed. The process may return to steps 918 and 920. For example the process may update priorities to phases of the task and implement the updated priorities based on the results of completion of the task monitored.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The different illustrative embodiments allow for prioritization of tasks performed for virtual machines. Prioritizing a task allows the use of resources used to complete the task to be tailored based on the importance of the task. Further, prioritization takes into account the effect performing the task may have on the use the resources by other virtual machines. Different types of tasks may receive different priorities. Different phases within the same type of task may receive different priorities. Resources availability is monitored to enable dynamic prioritization of the resources to perform the task while accounting for other uses of the resources.

Different illustrative embodiments may be implemented in cloud computing environments. Hypervisors can communicate with other hypervisors identify resources in different nodes in the cloud computing environment. Resources from different nodes may be used to perform tasks for the virtual machine. A prioritization scheme for the use of resources to perform the task can be implemented across the different nodes.

Thus, the different illustrative embodiments provide a method, a computer program product, and a system for managing tasks for a virtual machine. In an illustrative embodiment, an amount of resources to perform a task for the virtual machine are identified in response to receiving a request to perform the task for the virtual machine in a set of data processing systems. A set of resources in the set of data processing systems available to complete the task for the virtual machine are identified. A set of priorities for a set of phases of the task are identified. Operations are scheduled on the set of resources to perform the task for the virtual machine based on the set of priorities identified for the set of phases of the task.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for managing tasks for a virtual machine, the method comprising:

maintaining a table of information regarding tasks for the virtual machine, wherein the table includes information regarding set of priorities for performing each of the tasks, and information regarding an amount of resources in a set of resources that are needed to complete each of the tasks;

responsive to receiving a request to perform a task for the virtual machine in a set of data processing systems, identifying an amount of resources to perform the task for the virtual machine, wherein identifying the amount of resources to perform the task for the virtual machine comprises: identifying a type of the task and set of properties of the virtual machine; receiving information regarding a set of previous occurrences of the type of the task in the set of data processing systems; generating a model of the amount of resources and an amount of time the amount of resources are needed to perform the task based on the type of the task, the set of properties of the virtual machine, and the information regarding the set of previous occurrences; and identifying the amount of resources to perform the task from the model;

identifying a set of resources in the set of data processing systems available to complete the task for the virtual machine;

identifying a set of priorities for a set of phases of the task; and scheduling operations on the table of information to utilize the set of resources to perform the task for the virtual machine based on the set of priorities identified for the set of phases of the task.

2. The method of claim 1, wherein the type of the task is identified from a group of tasks, the group of tasks comprising a first task of migrating the virtual machine from one data processing system to another data processing system, a second task of taking a snapshot of resources in the virtual machine, a third task of backing up data for the virtual machine, a fourth task of cloning the virtual machine, and a fifth task of provisioning resources for the virtual machine.

3. The method of claim 1, wherein scheduling operations on the set of resources to perform the task for the virtual machine based on the set of priorities identified for the set of phases of the task comprises:

identifying a plurality of tasks being performed in the set of data processing systems and a priority of each of the plurality of tasks; and adjusting the priority for at least one of the plurality of tasks in order to perform the task for the virtual machine based on the set of priorities.

4. The method of claim 1, wherein identifying the set of priorities for the set of phases of the task comprises:

identifying a type of the task and a current phase of the task;

receiving a set of preferences for an amount of time to complete the set of phases for the type of the task;

identifying an importance of the type of task, each phase of the task, and the virtual machine;

identifying an effect performing the task will have on other virtual machines in the set of data processing systems that use the set of resources; and assigning the set of priorities based on the set of preferences, the importance, and the effect.

5. The method of claim 1, wherein the set of resources to perform the task comprises a set of processor units, a set of memories, a set of storage devices, and a set of network devices and wherein scheduling operations on the set of resources to perform the task for the virtual machine based on the set of priorities identified for the set of phases of the task comprises:

identifying the set of phases of the task and the set of priorities for each of the set of phases; and managing a first order of instructions to be executed by the set of processor units, a second order of operations to be performed by the set of storage devices, and a utilization of the set of network devices based on the set of priorities for each of the set of phases to perform the task.

6. The method of claim 1, wherein scheduling operations on the set of resources to perform the task for the virtual machine based on the set of priorities identified for the set of phases of the task comprises:

identifying the set of phases of the task and the set of priorities for each of the set of phases; and allocating the set of resources to perform the set of phases of the task to the virtual machines for periods of time based on the set of priorities for each of the set of phases to perform the task.

7. The method of claim 1, wherein the request is received by a hypervisor that manages the virtual machine in the set of data processing systems.

8. The method of claim 7, wherein the set of data processing systems are distributed across a network of data processing systems in a cloud computing environment and wherein the hypervisor identifies the set of resources from the set of data processing systems in the network of data processing systems in the cloud computing environment by communicating with other hypervisors for the set of data processing systems.

9. The method of claim 1, wherein the virtual machine is a configuration of resources in a data processing system that operates as an individual computer.

10. A computer program product for managing tasks for a virtual machine, the computer program product comprising:

a computer readable storage medium;

program code, stored on the computer readable storage medium, for maintaining a table of information regarding tasks for the virtual machine, wherein the table includes information regarding set of priorities for performing each of the tasks, and information regarding an amount of resources in a set of resources that are needed to complete each of the tasks;

program code, stored on the computer readable storage medium, for identifying an amount of resources to perform a task for the virtual machine in response to receiving a request to perform the task for the virtual machine, wherein identifying the amount of resources to perform the task for the virtual machine comprises: identifying a type of the task and set of properties of the virtual machine; receiving information regarding a set of previous occurrences of the type of the task in the set of data processing systems; generating a model of the amount of resources and an amount of time the amount of resources are needed to perform the task based on the type of the task, the set of properties of the virtual machine, and the information regarding the set of previous occurrences; and identifying the amount of resources from the model;

program code, stored on the computer readable storage medium, for identifying a set of resources in a set of data processing systems available to complete the task for the virtual machine;

program code, stored on the computer readable storage medium, for identifying a set of priorities for a set of phases of the task; and program code, stored on the computer readable storage medium, for scheduling operations on the table of information to utilize the set of resources to perform the task for the virtual machine based on the set of priorities identified for the set of phases of the task.

11. The computer program product of claim 10, wherein the type of the task is identified from a group of tasks, the group of tasks comprising a first task of migrating the virtual machine from one data processing system to another data processing system, a second task of taking a snapshot of resources in the virtual machine, a third task of backing up data for the virtual machine, a fourth task of cloning the virtual machine, and a fifth task of provisioning resources for the virtual machine.

12. The computer program product of claim 10, wherein the program code for identifying the set of priorities for the set of phases of the task comprises:
- program code, stored on the computer readable storage medium, for identifying a type of the task and a current phase of the task;
- program code, stored on the computer readable storage medium, for receiving a set of preferences for an amount of time to complete the set of phases for the type of the task;
- program code, stored on the computer readable storage medium, for identifying an importance of the type of task, each phase of the task, and the virtual machine;
- program code, stored on the computer readable storage medium, for identifying an effect performing the task will have on other virtual machines in the set of data processing systems that use the set of resources; and
- program code, stored on the computer readable storage medium, for assigning the set of priorities based on the set of preferences, the importance, and the effect.

13. The computer program product of claim 10, wherein the set of resources to perform the task comprises a set of processor units, a set of memories, a set of storage devices, and a set of network devices and wherein the program code for scheduling operations on the set of resources to perform the task for the virtual machine based on the set of priorities identified for the set of phases of the task comprises:
- program code, stored on the computer readable storage medium, for identifying the set of phases of the task and the set of priorities for each of the set of phases; and
- program code, stored on the computer readable storage medium, for managing a first order of instructions to be executed by the set of processor units, a second order of operations to be performed by the set of storage devices, and a utilization of the set of network devices based on the set of priorities for each of the set of phases to perform the task.

14. The computer program product of claim 10, wherein the request is received by a hypervisor that manages the virtual machine in the set of data processing systems, wherein the set of data processing systems are distributed across a network of data processing systems in a cloud computing environment, and wherein the hypervisor identifies the set of resources from the set of data processing systems in the network of data processing systems in the cloud computing environment by communicating with other hypervisors for the set of data processing systems.

15. A system comprising:
- a virtual machine in a set of data processing systems;
- a hypervisor in communication with the virtual machine and configured to receive a request to perform a task for the virtual machine; and
- a priority management system in communication with the hypervisor, the priority management system comprising a processor unit configured: to maintain a table of information regarding tasks for the virtual machine, wherein the table includes information regarding set of priorities for performing each of the tasks, and information regarding an amount of resources in a set of resources that are needed to complete each of the tasks; to identify an amount of resources to perform the task for the virtual machine by identifying a type of the task and set of properties of the virtual machine, receiving information regarding a set of previous occurrences of the type of the task in the set of data processing systems, generating a model of the amount of resources and an amount of time the amount of resources are needed to perform the task based on the type of the task, the set of properties of the virtual machine, and the information regarding a set of previous occurrences, and identifying the amount of resources from the model; identify a set of resources in the set of data processing systems available to complete the task for the virtual machine; identify a set of priorities for a set of phases of the task by identifying a type of the task and a current phase of the task, receiving a set of preferences for an amount of time to complete the set of phases for the type of the task, identifying an importance of the type of task, each phase of the task, and the virtual machine, identifying an effect performing the task will have on other virtual machines in the set of data processing systems that use the set of resources, and assigning the set of priorities based on the set of preferences, the importance, and the effect; and schedule operations on the table of information to utilize the set of resources to perform the task for the virtual machine based on the set of priorities identified for the set of phases of the task.

16. The system of claim 15, wherein the type of the task is identified from a group of tasks, the group of tasks comprising a first task of migrating the virtual machine from one data processing system to another data processing system, a second task of taking a snapshot of resources in the virtual machine, a third task of backing up data for the virtual machine, a fourth task of cloning the virtual machine, and a fifth task of provisioning resources for the virtual machine.

17. The system of claim 15, wherein the set of resources to perform the task comprises a set of processor units, a set of memories, a set of storage devices, and a set of network devices and wherein the priority management system schedules operations on the set of resources to perform the task for the virtual machine based on the set of priorities identified for the set of phases of the task by identifying the set of phases of the task and the set of priorities for each of the set of phases; and managing a first order of instructions to be executed by the set of processor units, a second order of operations to be performed by the set of storage devices, and a utilization of the set of network devices based on the set of priorities for each of the set of phases to perform the task.

18. The system of claim 15, wherein the hypervisor that manages the virtual machine in the set of data processing systems, wherein the set of data processing systems are distributed across a network of data processing systems in a cloud computing environment, and wherein the priority management system identifies the set of resources from the set of data processing systems in the network of data processing systems in the cloud computing environment by communicating with other hypervisors in the set of data processing systems.

19. A data processing system comprising:
- a bus system;
- a storage device connected to the bus system, wherein the storage device includes program code; and
- a processor unit connected to the bus system, wherein the processor unit is configured to execute the program code: to maintain a table of information regarding tasks for the virtual machine, wherein the table includes information regarding set of priorities for performing each of the tasks, and information regarding an amount of resources in a set of resources that are needed to complete each of the tasks; to identify an amount of resources to perform a task for a virtual machine in response to receiving a request to perform the task for the virtual machine, wherein identifying the amount of resources to perform the task for the virtual machine comprises: identifying a type of the task and set of properties of the virtual machine; receiving information regarding a set of previous occurrences of the type of the task in the set of data processing systems; generating a model of the amount of resources and an amount of time the amount of resources are needed to perform the task based on the type of the task, the set of properties of the virtual machine, and the information regarding the set of previous occurrences; and identifying the amount of resources from the mode; to identify a set of resources in a set of data processing systems available to complete the task for the virtual machine; to identify a set of priorities for a set of phases of the task; and to schedule operations on the table of information to utilize the set of resources to perform the task for the virtual machine based on the set of priorities identified for the set of phases of the task.

20. The data processing system of claim 19, wherein in executing the program code to identify the set of priorities for the set of phases of the task the processor unit further executes the program code to identify a type of the task and a current phase of the task, receive a set of preferences for an amount of time to complete the set of phases for the type of the task, identify an importance of the type of task, each phase of the task, and the virtual machine, identify an effect performing the task will have on other virtual machines in the set of data processing systems that use the set of resources, and assign the set of priorities based on the set of preferences, the importance, and the effect.

21. The data processing system of claim 20, wherein the type of the task is identified from a group of tasks, the group of tasks comprising a first task of migrating the virtual machine from one data processing system to another data processing system, a second task of taking a snapshot of resources in the virtual machine, a third task of backing up data for the virtual machine, a fourth task of cloning the virtual machine, and a fifth task of provisioning resources for the virtual machine.

22. The data processing system of claim 20, wherein the request is received by a hypervisor that manages the virtual machine in the set of data processing systems, wherein the set of data processing systems are distributed across a network of data processing systems in a cloud computing environment, and wherein the hypervisor identifies the set of resources from the set of data processing systems in the network of data processing systems in the cloud computing environment by communicating with other hypervisors in the set of data processing systems.

* * * * *